(12) United States Patent
Bivens

(10) Patent No.: US 6,955,118 B1
(45) Date of Patent: Oct. 18, 2005

(54) FILTER MOUNTING ASSEMBLY

(76) Inventor: Thomas H. Bivens, P.O. Box 1247, Magnolia, TX (US) 77353-1247

( * ) Notice: Subject to any disclaimer, the term of this patent is extended or adjusted under 35 U.S.C. 154(b) by 171 days.

(21) Appl. No.: 10/601,145

(22) Filed: Jun. 20, 2003

Related U.S. Application Data

(60) Provisional application No. 60/391,056, filed on Jun. 21, 2002.

(51) Int. Cl.[7] .......................... A47J 37/00; A47J 37/12
(52) U.S. Cl. .................... 99/408; 99/403; 210/167; 210/DIG. 8
(58) Field of Search .................... 99/330, 403–410; 426/417, 438; 210/167, DIG. 8, 460, 416.5, 210/110, 489, 461, 486; 126/391.1, 389.1

(56) References Cited

U.S. PATENT DOCUMENTS

| | | | | |
|---|---|---|---|---|
| 2,053,568 A | * | 9/1936 | Levin ........................... | 99/408 |
| 2,287,396 A | * | 6/1942 | Roth ........................ | 126/380.1 |
| 2,610,740 A | * | 9/1952 | Hunter ........................ | 210/460 |
| 3,107,601 A | * | 10/1963 | Longmire ..................... | 99/330 |
| 3,263,818 A | * | 8/1966 | Gedrich ................... | 210/416.5 |
| 3,279,605 A | * | 10/1966 | Shepherd ..................... | 210/110 |
| 3,477,361 A | * | 11/1969 | Bradshaw ..................... | 99/408 |
| 3,483,982 A | * | 12/1969 | Nelson ......................... | 210/167 |
| 3,495,525 A | * | 2/1970 | Piotrowski ................... | 99/408 |
| 4,599,990 A | * | 7/1986 | Fritzsche et al. ......... | 126/374.1 |
| 4,945,893 A | * | 8/1990 | Manchester .............. | 126/391.1 |
| 5,101,714 A | * | 4/1992 | Grandi ......................... | 99/335 |
| RE34,636 E | | 6/1994 | Bivens | |
| 5,404,799 A | | 4/1995 | Bivens | |
| 5,486,370 A | | 1/1996 | Bivens | |

* cited by examiner

*Primary Examiner*—Timothy F. Simone
(74) *Attorney, Agent, or Firm*—Keeling Hudson LLC; Kenneth A. Keeling

(57) ABSTRACT

A filter mounting system of a filter assembly for a fryer apparatus is disclosed, the filter mounting system including a slip fitting slidably receivable in a slip fitting receiver of a tank outlet port. A grasping member is functionally attached to the mounting system for removal of the filter assembly without the necessity of cooling the cooking oil contained in the fryer.

15 Claims, 5 Drawing Sheets

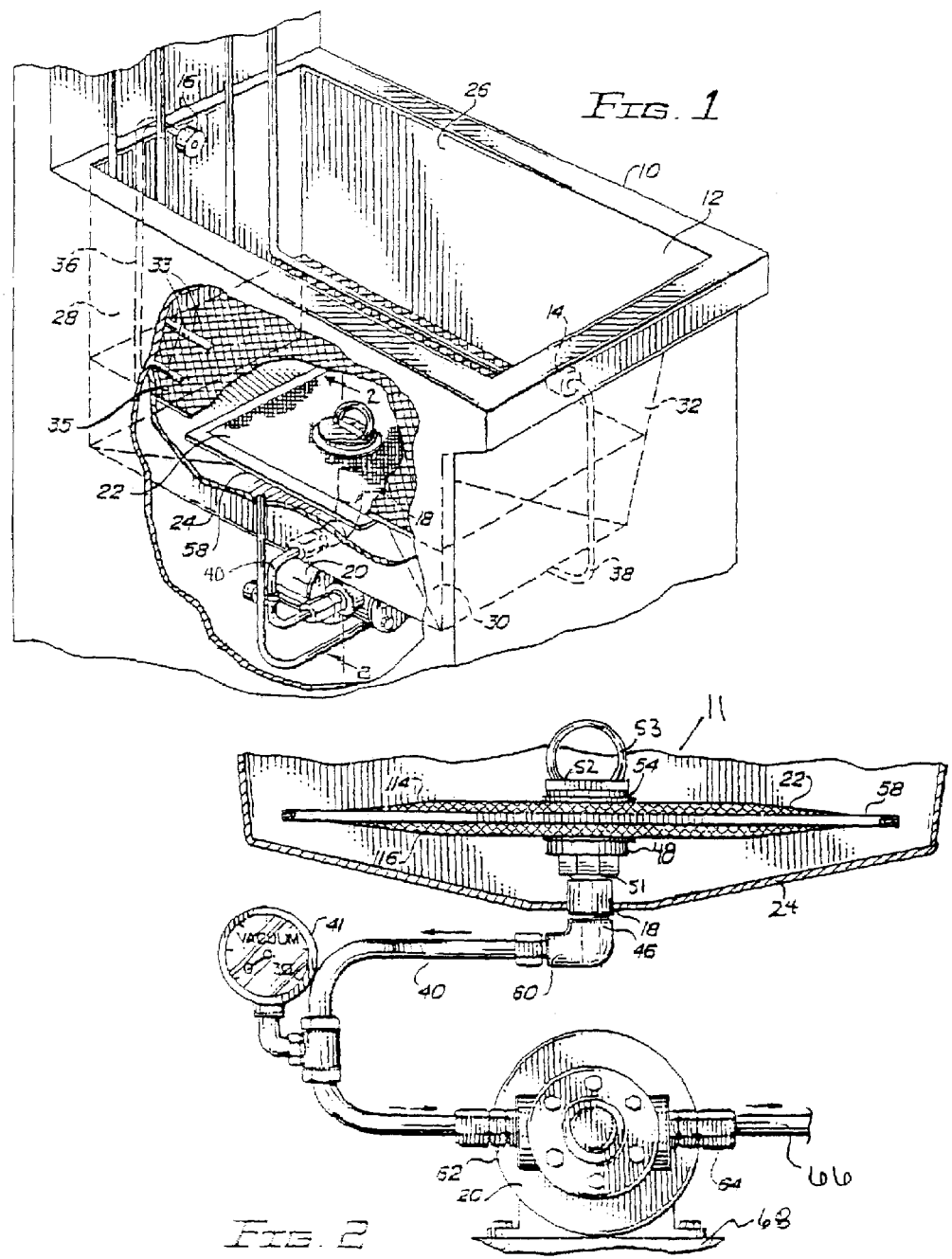

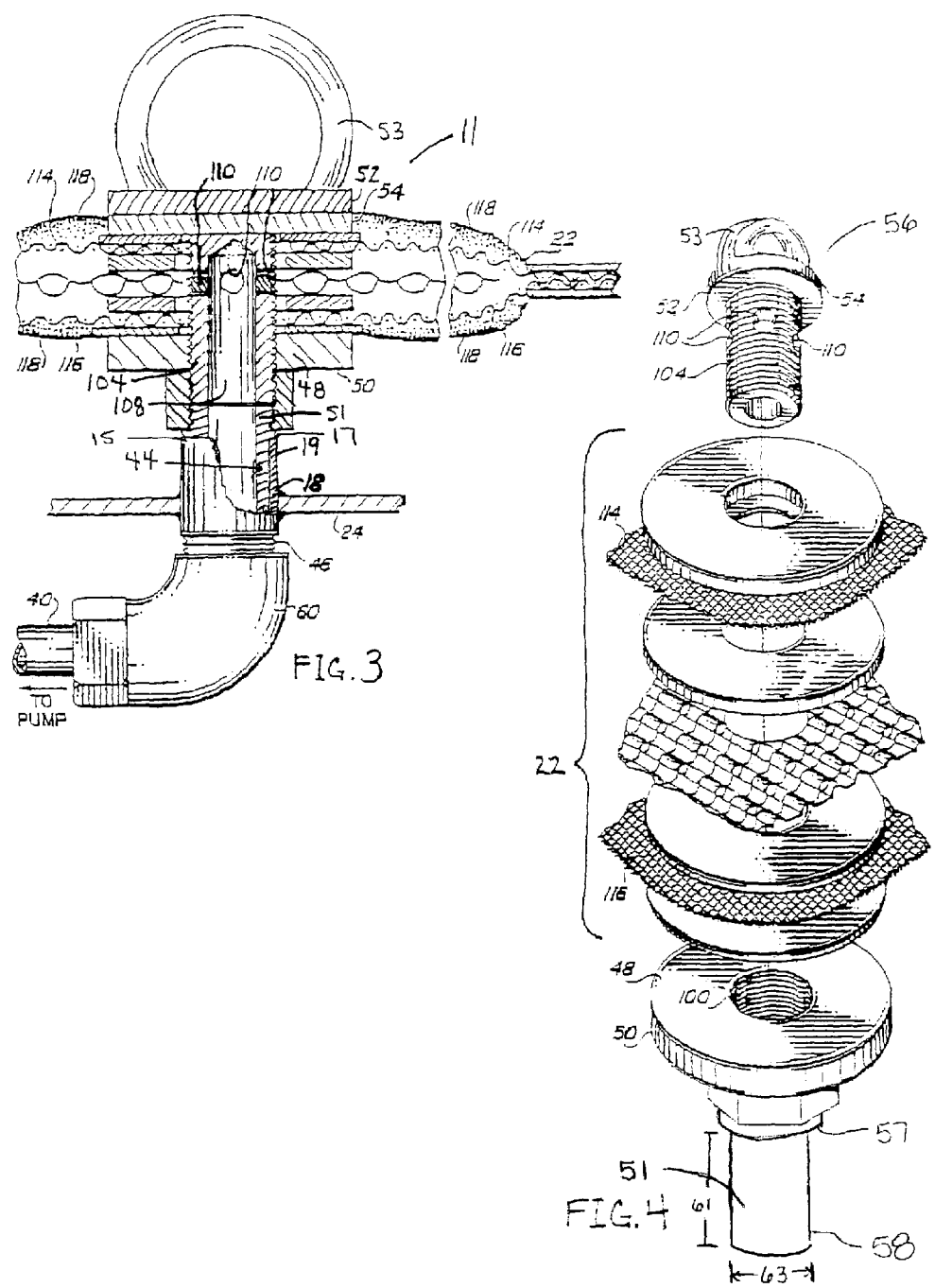

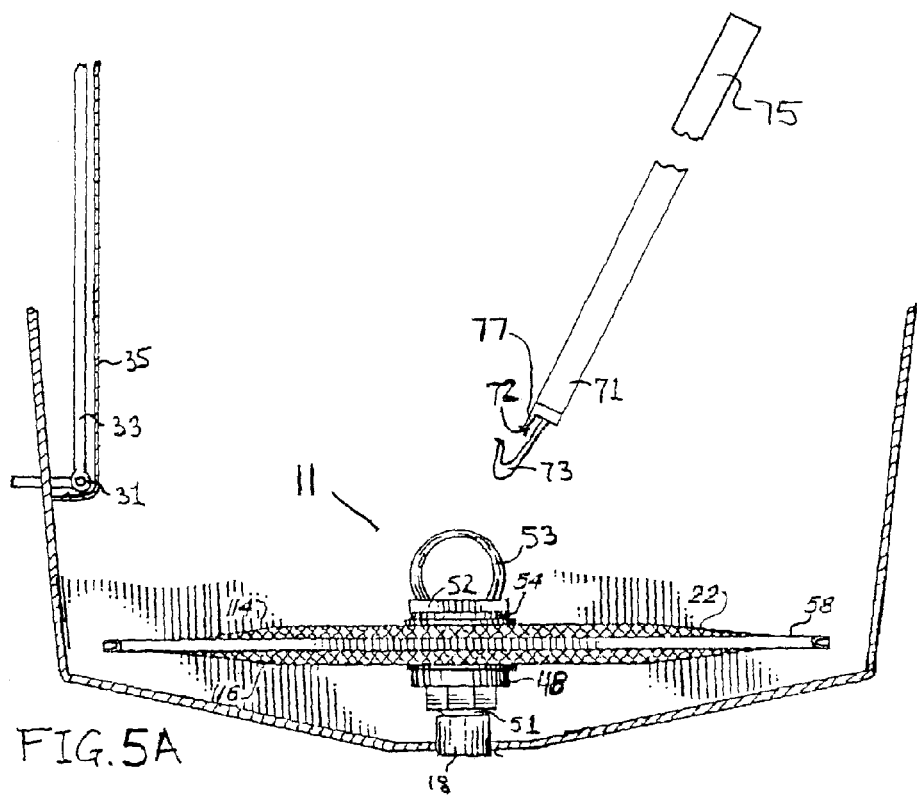

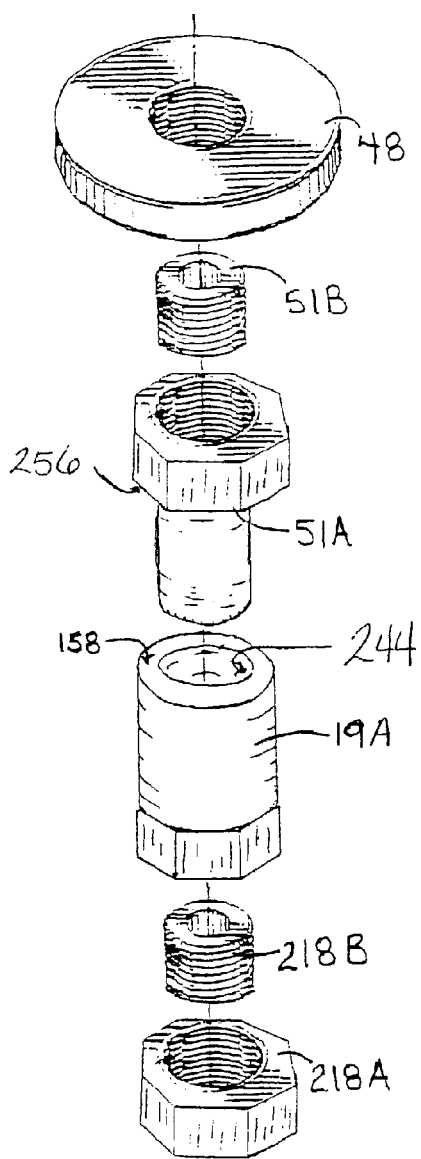
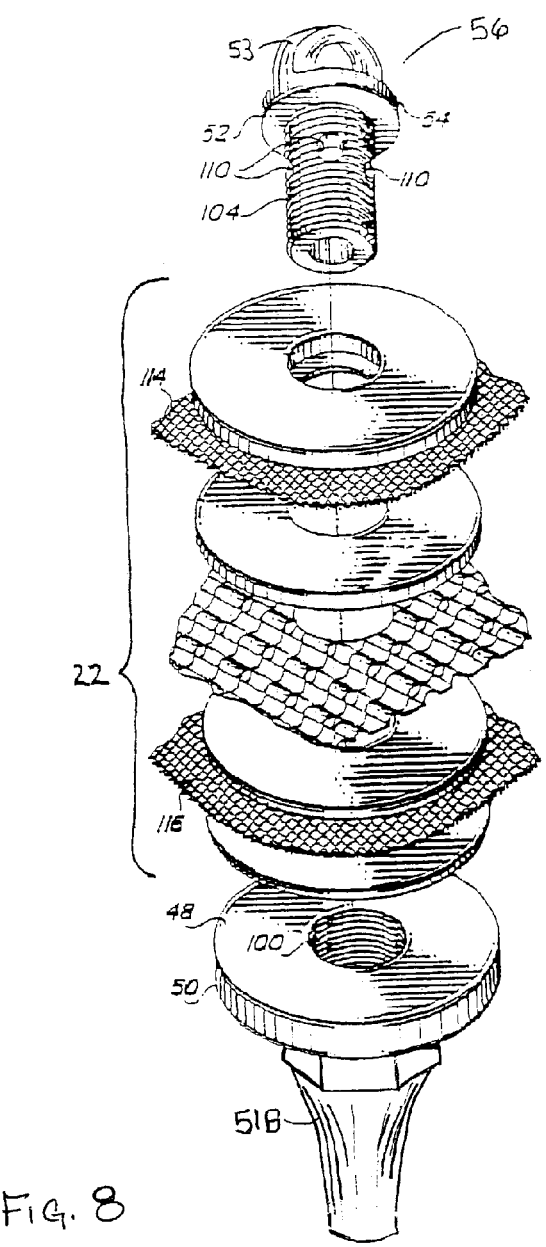
FIG. 7
FIG. 8

FILTER MOUNTING ASSEMBLY

CROSS-REFERENCE TO RELATED APPLICATIONS

This application claims the benefit of provisional application No. 60/391,056 entitled, "Fryer Filter Slip Mount And Method of Use," filed Jun. 21, 2002 in the United States Patent and Trademark Office.

STATEMENT REGARDING FEDERALLY SPONSORED RESEARCH OR DEVELOPMENT

Not Applicable.

BACKGROUND OF THE INVENTION

1. Field of the Invention

The present invention relates generally to frying apparatuses for deep-fat frying. More particularly, the present invention relates to a deep-fat fryer filter mounting apparatus, which permits removal of the filter assembly while the oil is hot.

2. Description of the Related Art

Cooking oil is extensively used in the food industry to cook various comestibles. Animal fat or other suitable material may sometimes be used as the cooking material in lieu of cooking oil. The term "cooking oil" is used herein to designate any such material.

Frying is frequently accomplished in relatively deep containers with the comestible to be cooked immersed in the cooking oil. In cases where quantities of food are regularly cooked in such a manner, the cooking oil becomes contaminated with various particles of food or other impurities, and charred food particles produce an odor, which adversely affects the taste of foods cooked therein.

Existing commercially available systems and apparatus for filtering cooking oil require that the cooking operation be interrupted to filter the cooking oil or to clean continuous filtering systems. A disadvantage of presently practiced methods of filtering cooking oil is that such methods require that the cooking operation be ceased during the period that the cooking oil is filtered. This results in significant downtime. Even with continuous filtering systems there is periodic delay for cleaning of the filters, which require the cooking oil to be cooled or drained.

U.S. Pat. No. Re. 34,636, reissued on Jun. 14, 1994, to the present inventor, describes a cooking oil filtering apparatus, which can be used to effectively remove particulates from the cooking oil. Such particulates may include coatings from fried objects, seasonings and the like. The cooking oil is drawn through wire mesh screens by applying suction at the filter interior. As the cooking oil is drawn to the wire mesh screens, the screen serves to remove particulates from the cooking oil. The particulate-free cooking oil is then drawn into an outlet and drawn through the tank to a pump. The pump passes the cooking oil back into the tank. This process is carried on until particulate matter is removed from the cooking oil. A filter powder may be dispersed in the cooking oil to accumulate on the outer surfaces of the wire mesh screens. The subject apparatus eliminated the need for filter paper.

U.S. Pat. No. 5,404,799, issued on Apr. 11, 1995, and U.S. Pat. No. 5,486,370, issued on Jan. 23, 1996, both to the present inventor, describe a cooking oil filtering apparatus and method which can be used to effectively remove particulates from the cooking oil. Though relatively infrequent, the apparatus and method require periodic shut-downs for cleaning operations.

The patent references and references contained therein neither teach nor disclose a filter mounting system for a continuous-filtering fryer of the present invention.

BRIEF SUMMARY OF THE INVENTION

The present invention is a filter mounting system for a continuous-filtering fryer of the type that includes a filter disposed in the fryer container, an outlet port connected to the filter, a container inlet and a pump for circulation of cooking oil through the filter, the outlet port and back into the container through a container inlet. The filter mounting system comprises a filter assembly that is releasably attached to the outlet port by a slip connect that may be readily and safely removed from the fryer without cooling of the cooking oil. A grasping member may be engaged by an adapted rod to remove the filter assembly from the tank while the cooking oil is hot.

The filter assembly may be assembled to maintain a variety of attitudes within the tank. The outlet port is in fluid communication with the interior of the tank so as to draw the cooking oil through mesh screens of the filter assembly. The filter assembly includes a lower cap member. The lower cap member is attached to a slip fitting, designed to slidably engage a receiving member of the outlet port. The lower cap serves to support the filter assembly relative to the outlet port and the tank. The lower cap member and slip fitting have an annular interior extending therethrough in fluid communication with the outlet port. The filter assembly also includes an upper cap member, which is threadedly received by the lower cap member. The upper cap has a head, a grasping member and a body portion.

Accordingly, the objects of my invention is to provide, inter alia, a slip mounting apparatus that:
provides a stable mount for a fryer filter assembly;
provides a short filter cleaning period; and
provides for cleaning a fryer filter system without cooling the cooking oil.

Other objects of my invention will become evident throughout the reading of this application.

BRIEF DESCRIPTION OF THE DRAWINGS

FIG. 1 is a partially cutaway isometric view of a continuous-filtering fryer employing a filtering mounting apparatus of the present invention.

FIG. 2 is a partial cross-sectional side view of the apparatus in the fryer of FIG. 1 taken across line 2—2.

FIG. 3 is a detailed cross-sectional and partially cutaway view of a horizontal filter assembly of the apparatus of FIG. 1.

FIG. 4 is an exploded view of the horizontal filter assembly of FIG. 1.

FIG. 5A is a partial cross-sectional side view of the apparatus mounted in a FIG. 2, with the heating element raised for filter cleaning.

FIG. 5B is a partial cross-sectional side view of the apparatus mounted in a FIG. 2, with the heating element in place for heating cooking oil.

FIG. 7 is an exploded view of an alternate embodiment of the slip connect of the present invention.

FIG. 8 is an exploded view of an alternate embodiment of the slip connect of the present invention.

DESCRIPTION OF THE INVENTION

Figure 6:
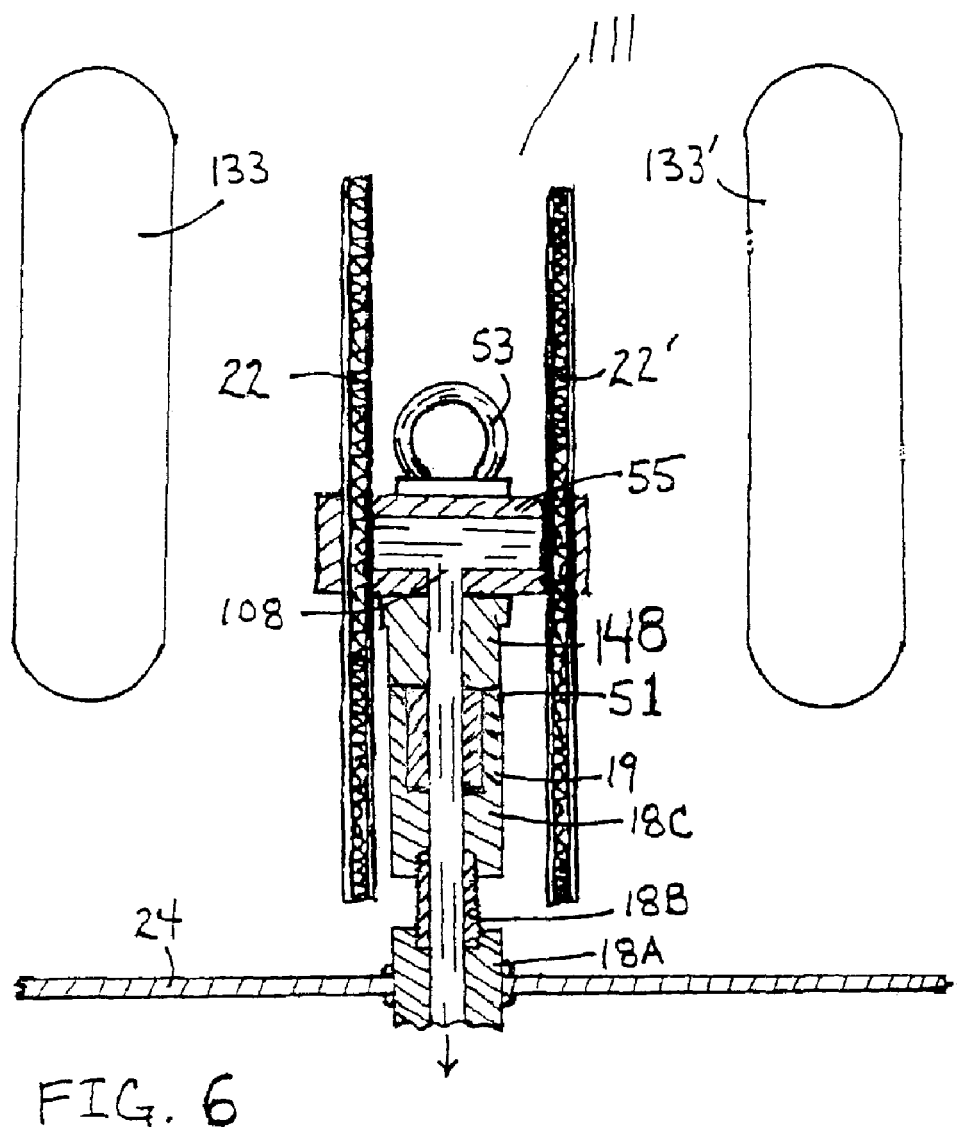
FIG. 6 is a side view of an alternate vertical filter assembly of the present invention, with the front half cut away.

Referring to FIG. 1, there is shown at 10 a continuous-filtering fryer apparatus for use with the preferred embodiment of the filter assembly 11, shown in FIG. 2, of the present invention. The continuous-filtering fryer apparatus 10 comprises tank 12, inlet ports 14 and 16, and outlet port 18, pump 20 and filter assembly 11. Each of these elements are arranged so as to provide the necessary filtering of the cooking oil (not shown) contained within the fryer apparatus 10.

The tank 12 is suitable for receiving cooking oil therein. Tank 12 includes a bottom 24 and side walls 26, 28, 30, and 32. The side walls 26, 28, 30, and 32 extend upwardly from the bottom 24. The walls are arranged so as to define tank 12 for the containing of cooking oil therein. Suitable heating elements 33 are provided above screen 35 within the tank 12 so as to bring the cooking oil to a proper temperature. The heating elements 33 and the screen 35 are positioned above filter assembly 11 in tank 12. Heating elements 33 extend across the interior of tank 12. Segments of the heating elements 33 are shown in FIG. 1.

Referring to FIGS. 1 and 2, inlet ports 14 and 16 are affixed to side walls 32 and 28, respectively. Typically, inlet ports 14 and 16 are positioned below the level of the cooking oil within tank 12. Inlet ports 14 and 16 communicate with the interior of tank 12. Return line 38 is connected to port 14, so as to allow cooking oil to be passed through port 14 into the interior of tank 12. Return line 36 is connected to port 16 to allow delivery of cooking oil through port 16 into the interior of tank 12. A single return line 36 or 38 and a single inlet port 14 or 16 may be used.

The outlet port 18 is affixed to the tank 12, so as to be in communication with an interior of tank 12 generally adjacent to bottom 24 of tank 12. Outlet port 18 is connected by line 40 to pump 20. Outlet port 18 and pump 20 are designed so as to produce a suction, which draws the cooking oil through the filter 22 of the filter assembly 11. The cooking oil is drawn through line 40 into pump 20. Pump 20 pumps the cooking oil through line 66 to return lines 38 and 36 leading to inlet ports 14 and 16, respectively.

FIGS. 2, 3 and 4 show the configuration of filter assembly 11 as attached to outlet port 18. Outlet port 18 extends through the bottom 24 of tank 12 and is sealed about its periphery to tank 12. Outlet port 18 includes an interior passageway which allows for the movement of cooking oil therethrough.

Slip fitting receiver 19 extends upward from outlet port 18. Slip fitting receiver 19 includes interior formed surface 44. Outlet port 18 may include threaded portion 46 extending below bottom surface 24 for removable attachment to line 40 or may be fixedly attached to line 40.

A slip fitting assembly 56 provides fluid communication between filter 22 and outlet port 18. Slip fitting assembly 56 includes slip fitting 51 for connection with outlet port 18. Slip fitting 51 and interior surface 44 are so formed that slip fitting 51 is readily slidably received in slip fitting receiver 19 and readily removed from slip fitting receiver 19.

Slip fitting assembly 56 includes a lower cap 48 and an upper cap 52. Lower cap 48 has internally threaded passageway 100. One end of a slip fitting 51 is threadedly connected internally to one end of lower cap 48. The other end 58 of slip fitting 51 slidably seats into slip fitting receiver 19. Lower cap 48 extends upwardly and includes a generally flat top lip 50.

A shoulder 17 is provided on slip fitting 51. Upon installation of slip fitting 51 into receiver 19 shoulder 17 of slip fitting assembly 56 rests on upper end 15 during operation of pump 20. Top lip 50 supports the filter 22 in a generally parallel relationship to bottom surface 24 of tank 12. Accordingly, slip fitting assembly 56 is supported in an upright position in slip fitting receiver 19.

Slip fitting 51 and interior surface 44 are structured such that they fit closely while allowing sliding movement. In addition, slip fitting 51 length 61 is greater than slip fitting 51 width 63. The combination of the relatively close fit of slip fitting 51 and interior surface 44 and the greater length 61 versus width 63 provide stable support of filter assembly 56.

In preferred embodiment, slip fitting 51 is cylindrical and interior surface 44 comprises the interior surface of a hollow cylinder.

Upper cap 52 includes grasping member 53, bolt head 54, and externally threaded upper cap body 104. Upper cap 52 is threadedly connected internally of lower cap 48. Filter 22 is sandwiched between upper cap 52 and lower cap 48. In exemplary filter assembly 11, filter 22 is comprised of multiple layers of washers, filter material and flow directing materials as well as mesh screens 114 and 116. Upper cap body 104 has a plurality of radial ports 110, which extend through the interior of upper cap 52, so as to allow for suction forces interior of filter 22, between the outside filter layers of upper mesh screen 114 and a lower mesh screen 116.

Grasping member 53 extends upwardly from the bolt head 54. In the preferred embodiment, grasping member 53 describes a loop structure.

A heat resistant rod 71 is configured with hook 73 to engage the grasping member member 53 on filter assembly 11 and distal handle 75. Rod 71 is of sufficient length to allow a user to engage grasping member 53 by hook 73 with handle 75 positioned above tank 12. Hook 73 is structured to allow the user to engage and release member 53 so that filter assembly 11 may be lifted from tank 12. As the lifting is done by means of the remotely positioned handle 75, it is not necessary to cool the cooking oil in the tank 12 prior to removal of the filter assembly 11.

Heat resistant rod 71 may be provided with extension 77 extending from rod 71 toward hook 73. Extension 77 defines hook well 72.

Threaded body portion 104 has interior passageway 108. Interior passageway 108 is in fluid communication with the interior passageway of outlet port 18. Interior passageway 108 is drilled and tapped through body portion 104 so as to be in fluid communication with radial ports 110. In this manner, filter 22 allows the flow of oil through filter assembly 11, while trapping cooking particulates.

Upper cap 52 is threadedly fastened to lower cap 48, so as to allow for simple removal and disassembly of filter 22, as needed. Exemplary filter 22 is a generally flat member, which extends near bottom surface 24 within tank 12. In use, the cooking oil will flow around all sides of filter 22.

Referring to FIGS. 2, 3, and 4, outlet port 18 has threaded portion 46, which is threadedly connected to elbow 60 below bottom surface 24 of tank 12. Elbow 60 connects to line 40. Line 40 extends below the bottom surface 24 to inlet port 62 of pump 20. When pump 20 is activated, a suction force is created through line 40 and filter 22. In effect, this causes cooking oil contained within the interior of tank 12 to flow through filter 22. Mesh screens 114 and 116 will cause the particulate matter within the cooking oil to accumulate on the surfaces. The filtered cooking oil flows through line 40 to pump 20.

Pump 20 includes pump outlet port 64 connected to line 66. Pump 20 causes the filtered cooking oil to pass through pump outlet port 64 and into line 66 in a continuous fashion. Line 66 will pass the cooking oil toward return lines 38 and 36, as connected to inlet ports 14 and 16 on side walls of tank 12. The arrows of FIG. 2 show the flow of cooking oil during the operation of the present invention.

It is a feature of the exemplary fryer that pump 20, when activated, exerts a negative pressure through outlet port 18 thereby drawing cooking oil through filter 22. Such negative pressure further secures slip fitting 51 within interior surface 44. Preferably, pump 20 is not activated when filter assembly 11 is being removed from receiver 19.

Referring to FIGS. 1, 5A and 5B, electrical heating elements 33 are positioned over screen 35 and attached to side wall 28 with hinges 31. Heating elements 33 have a lowered position in which heating elements 33 are relatively parallel to bottom 24 and completely submerged in cooking oil. In raised position, heating elements 33 are rotated upward at hinge 31 to the point where heating element 33 no longer obstructs access to filter assembly 11. In raised position, heating element may extend out of the cooking oil.

In an alternate embodiment, filter assembly 11 may have varied filter configurations. Referring to FIG. 6, the exemplary embodiment has two filters 22 and 22' positioned vertically and parallel. Filters 22 and 22' are mounted each to an end of T-cap 55. On top of T-cap 55 is grasping member 53. Opposite member 53, T-cap 55 threadedly attaches to lower cap 148. Lower cap 148 attaches to slip fitting 51, opposite T-cap 55. The filter assembly 11 of such alternative embodiment is adapted for insertion in relatively narrow and deep segments of tank 12 as are found in gas fryers.

Outlet port base 18A is housed in bottom 24 in a manner similar to outlet port 18 in FIG. 3. Outlet port base 18A threadedly receives outlet port extension 18B, which extends outlet port receiver 18C away from bottom 24, so that filters 22 and 22' do not touch bottom 24. Outlet port receiver 18C is shaped inside to form slip fitting receiver 19, which slidably joins to slip fitting 51.

Referring to FIG. 7, alternate embodiment slip fitting 51A is structured in relation to insert receiver 19A to allow slidable connection to alternate embodiment outlet port 218C. Slip fitting 51A is internally threaded similarly to lower cap 48 and is coupled to lower cap 48 with externally threaded connector 51B.

Outlet port base 218A is housed in bottom 24 in a manner similar to outlet port 18A in FIG. 6. Outlet port base 218A threadedly receives outlet port extension 218B, which extends insert receiver 19A away from bottom 24.

Insert receiver 19A has interior formed surface 244, shaped to receive slip fitting 51A so that slip fitting receiver 19A provides stable support to slip fitting 51A and the attached filter assembly 11.

With slip fitting 51A seated in slip fitting receiver 19A, fitting shoulder 256 abuts against upper end 158 of insert receiver 19A. Filter assembly 11 is accordingly supported on insert receiver 19A and held in fixed position by the fit of slip fitting 51A in receiver 19A.

Referring to FIG. 8, an alternate embodiment slip fitting 51B is depicted. In the alternate embodiment, slip fitting 51B has a tapered contour. Outlet port receiver (not shown) has a corresponding inner taper to match the taper of slip fitting 51B.

Referring to FIGS. 2 and 3, in operation, upon activation of pump 20, the cooking oil is drawn by suction applied by pump 20 through filter assembly 11, into the interior passageway of outlet port 18, and through line 40 to pump 20.

The vacuum gauge 41 monitors the vacuum of line 40 between filter assembly 11 and pump 20. Increased vacuum at vacuum gauge 41 indicates a build-up of filter cake 118 and other particulate matter (such as coating or seasoning from items being fried) on filter assembly 11.

Referring to FIGS. 4 and 5A, upper cap 52 includes head 54 and grasping member 53 such that a heat resistant rod 71, with a suitable hook 73, may engage member 53 in order to extract filter assembly 11 while the cooking oil is hot.

When the build-up of filter cake 118 on filter assembly 11 reaches a point where filter 22 needs to be cleaned, the entire filter assembly may be removed without cooling the cooking oil. In one exemplary embodiment, heating elements 33 are electric and must be turned off prior to being rotated out of the oil. Once heating elements 33 are raised, allowing access to filter assembly 11, a heat resistant rod 71, configured with hook 73 to engage the grasping member member 53 on filter assembly 11, is extended into the cooking oil. Hook 73 is engaged with member 53 and upward force is applied to filter assembly 11 from rod 71. Once sufficient force is applied, slip fitting receiver 19 releases slip fitting 51, and filter assembly 11 may be lifted from the cooking oil and removed from tank 12 to be cleaned. A clean replacement filter assembly 11 may be installed while the original filter assembly 11 is being cleaned, or the original filter assembly may be immediately cleaned and replaced.

To reinstall filter assembly 11, filter assembly 11 is grasped by member 53 with hook 73 on rod 71. Rod 71 is manipulated to place filter assembly 11 into tank 12 and submerge filter assembly 11 into the cooking oil. The operator uses rod 71 to position slip fitting 51 into slip fitting receiver 19 in outlet port 18. The operator then pushes down on rod 71, engaging hook well 72 onto member 53, which applies pressure to slip fitting 51, seating slip fitting 51 in slip fitting receiver 19. Hook well 72 is not necessary in all cases. Pushing down on upper cap 52 with the end of rod 71 or hook 73 may apply sufficient force to engage slip fitting 51 into slip fitting receiver 19. Once a clean filter assembly 11 is installed normal operation of fryer 10 may resume.

Referring to FIG. 6, an embodiment for a gas-heated fryer includes gas heating elements 133 and 133' that do not obstruct access to filter assembly 111 from the top. In this embodiment, filter assembly 111 may be removed while heating elements 133 and 133' are engaged. As with filter assembly 11 in FIG. 5A, filter assembly 111 is removed and reinstalled by the use of rod 71, with hook 73 and hook well 72. Once a clean filter assembly 111 is installed, normal operation of fryer 10 may resume.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

What is claimed is:

1. A filter mounting assembly for a fryer having a tank for containing hot oil and a filter for filtering particulates from said hot oil, said tank having a bottom, said filter mounting assembly comprising:

a slip fitting receiver attached to said tank;
a slip fitting assembly attached to said filter assembly;
said slip fitting assembly having an assembly first end and an assembly second end;
a slip fitting provided at said assembly first end;
said slip fitting slidably engagable to said slip fitting receiver;
said slip fitting assembly having a grasping member attached to said assembly second end;
said slip fitting assembly having an interior flow passageway; and
said grasping member comprising a structure extending upward from said assembly second end defining an opening capable of receiving a hook.

2. The apparatus of claim 1, further comprising:
an outlet port through said bottom of said tank;
said slip fitting receiver is attached to said outlet port; and
said slip fitting passageway, said slip fitting receiver and said outlet port allowing fluid communication of cooking oil from said filter through said outlet port.

3. The apparatus of claim 2, further comprising:
said slip fitting and said slip fitting receiver so constructed that said slip fitting is closely received within said slip fitting receiver.

4. The apparatus of claim 3, further comprising:
said slip fitting having a fitting length and a fitting width; and
said fitting length greater than said fitting width.

5. The apparatus of claim 3, further comprising:
said slip fitting further comprising a fitting shoulder;
said fitting receiver having a receiver upper end; and
said fitting shoulder resting on said receiver upper end when said slip fitting is received in said fitting receiver.

6. The apparatus of claim 1, further comprising:
said slip fitting assembly further comprising a lower cap and an upper cap;
said lower cap and said upper cap threadably connected;
said lower cap having a lower cap lip;
said lower cap lip supporting said filter;
said upper cap having a plurality of ports; and
said plurality of ports in fluid communication with said filter and said slip fitting passageway.

7. The apparatus of claim 1, further comprising:
an elongated rod; and
said rod having a hook configured for grasping said grasping member.

8. The apparatus of claim 7, further comprising:
a hook well provided on said rod proximate said hook; and
said hook well configured for pushing said grasping member.

9. The apparatus of claim 1, further comprising:
a plurality of filters positioned vertical to said bottom of said tank;
a multi-filter connector connected to each of said plurality of filters;
said multi-filter connector attached intermediate said second end of said slip fitting assembly and said grasping member; and
said multi-filter connector in fluid communication with said plurality of filters and said slip fitting assembly.

10. The apparatus of claim 1, further comprising:
said slip fitting having a surface;
said exterior surface having a surface taper;
said surface taper constructed such that said exterior surface is larger proximate said filter than the exterior surface distal said filter;
said slip fitting receiver having a complimentary tapered interior.

11. The apparatus of claim 1, wherein said slip fitting assembly comprises;
an upper cap;
said grasping member attached to said upper cap;
said upper cap having an upper cap body;
said upper cap body having an interior passageway and a plurality of radial ports;
a lower cap having a lower cap passageway;
said upper cap threadedly attached to said lower cap;
said filter located between said upper cap and said lower cap;
said slip fitting attached to said lower cap;
said radial ports in fluid communication with said interior passageway and said at least one filter;
said interior passageway in fluid communication with said lower cap passageway;
said lower cap passageway in fluid communication with said slip fitting;
said slip fitting in fluid communication with said slip fitting receiver; and
said slip fitting receiver in fluid communication with said outlet port.

12. A filter mounting assembly for a fryer having a tank for containing hot oil and a filter assembly for filtering particulates from said hot oil, said tank having a bottom, said filter mounting assembly comprising:
a slip fitting receiver attached to said tank;
a slip fitting assembly attached to said filter assembly;
said slip fitting assembly having an assembly first end and an assembly second end;
a slip fitting provided as said assembly first end;
said slip fitting slidably engagable to said slip fitting receiver;
said slip fitting assembly having a grasping member attached to said assembly second end;
said slip fitting assembly having an interior flow passageway;
an outlet port through said bottom of said tank;
said slip fitting receiver attached to said outlet port;
said slip fitting passageway, said slip fitting receiver and said outlet port allowing fluid communication of cooking oil from said filter through said outlet port:
an elongated rod;
said rod having a hook configured for gasping said grasping member;
a hook well provided on said rod proximate said hook; and
said hook well configured for pushing said grasping member.

13. The apparatus of claim 12, further comprising:
said grasping member comprising a structure extending upward from said assembly second end defining an opening capable of receiving a hook;
said slip fitting assembly further comprising a lower cap and an upper cap;
said lower cap and said upper cap threadably connected;
said lower cap having a lower cap lip;
said lower cap lip supporting said filter;
said upper cap having a plurality of ports; and
said plurality of ports in fluid communication with said filter and said slip fitting passageway.

14. The apparatus of claim 12, wherein said slip fitting assembly comprises:
an upper cap;
said grasping member attached to said upper cap;

said upper cap having an upper cap body;

said upper cap body having an interior passageway and a plurality of radial ports;

a lower cap having a lower cap passageway;

said upper cap threadedly attached to said lower cap;

said filter located between said upper cap and said lower cap;

said slip fitting attached to said lower cap;

said radial ports in fluid communication with said interior passageway and said at least one filter;

said interior passageway in fluid communication with said lower cap passageway;

said lower cap passageway in fluid communication with said slip fitting;

said slip fitting in fluid communication with said slip fitting receiver; and said slip fitting receiver in fluid communication with said outlet port.

15. A filter mounting assembly for a fryer having a tank for containing hot oil and a filter for filtering particulates from said hot oil, said tank having a bottom, said filter mounting assembly comprising:

a slip fitting receiver attached to said tank;

a slip fitting assembly attached to said filter assembly;

said slip fitting assembly having an assembly first end and an assembly second end;

a slip fitting provided as said assembly first end;

said slip fitting slidably engagable to said slip fitting receiver;

said slip fitting assembly having a grasping member attached to said assembly second end;

said slip fitting assembly having an interior flow passageway;

said grasping member comprising a structure extending upward from said assembly second end defining an opening capable of receiving a hook;

said slip fitting assembly further comprising a lower cap and an upper cap;

said lower cap and said upper cap threadably connected;

said lower cap having a lower cap lip;

said lower cap lip supporting said filter;

said upper cap having a plurality of ports;

said plurality of ports in fluid communication with said filter and said slip fitting passageway;

an elongated rod;

said rod having a hook configured for grasping said grasping member;

a hook well provided on said rod proximate said hook; and said hook well configured for pushing said grasping member.

* * * * *